(12) United States Patent
Klausen et al.

(10) Patent No.: US 6,478,116 B1
(45) Date of Patent: Nov. 12, 2002

(54) LUBRICATING OIL SUPPLYING ARRANGEMENT FOR AN APPARATUS HAVING A ROTATING APPARATUS SHAFT

(75) Inventors: Jørn Holger Klausen, Nordborg (DK); Peter Frøslev, Sydals (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/674,212

(22) PCT Filed: Jun. 7, 1999

(86) PCT No.: PCT/DK99/00301

§ 371 (c)(1),
(2), (4) Date: Oct. 27, 2000

(87) PCT Pub. No.: WO99/64745

PCT Pub. Date: Dec. 16, 1999

(30) Foreign Application Priority Data

Jun. 9, 1998 (DE) .......................... 198 25 650

(51) Int. Cl.[7] .............................................. F16N 13/20
(52) U.S. Cl. ...................................... 184/31; 417/410.4
(58) Field of Search ................. 184/6.16, 6.18, 184/31, 35; 417/410.4, 423.3; 418/206.1

(56) References Cited

U.S. PATENT DOCUMENTS

| | | | | |
|---|---|---|---|---|
| 1,418,741 A | * | 6/1922 | Stallman | ...................... 418/188 |
| 4,978,282 A | * | 12/1990 | Fu et al. | ...................... 417/360 |
| 5,017,108 A | * | 5/1991 | Murayama et al. | ......... 418/55.6 |
| 5,372,490 A | * | 12/1994 | Fain | ........................... 418/55.6 |
| 5,393,203 A | * | 2/1995 | Hantle | ........................ 417/203 |
| 5,449,051 A | * | 9/1995 | Liao | .......................... 184/55.1 |
| 5,725,362 A | * | 3/1998 | Zepp et al. | .................. 417/366 |
| 5,779,005 A | * | 7/1998 | Jones, Jr. et al. | ........... 184/6.18 |
| 5,961,293 A | * | 10/1999 | Clemmons et al. | ......... 417/44.2 |
| 5,997,262 A | * | 12/1999 | Finkbeiner et al. | ...... 471/410.4 |

* cited by examiner

Primary Examiner—David A. Bucci
Assistant Examiner—Timothy McAnulty
(74) Attorney, Agent, or Firm—Lee, Mann, Smith, McWilliams, Sweeney & Ohlson

(57) ABSTRACT

A lubricating oil supplying arrangement for an apparatus having a rotating apparatus shaft with an oil pump is arranged at one end of the apparatus shaft (23) and is driven by this apparatus shaft (23). A pump housing (2) has a pocket (3) in the form of a chamber open on one side, in which two co-operating displacement elements (4,5) are so arranged that the pump housing (2) covers the displacement elements (4,5) axially on both sides at least in an operative region and in the circumferential direction over a maximum of 180°. The displacement elements (4,5) are held in position by a pump shaft (13). This pump shaft (13) is connected via coupling elements to the apparatus shaft (23) so that they rotate together. This permits a construction having narrow tolerances that is easy to assemble.

12 Claims, 2 Drawing Sheets

LUBRICATING OIL SUPPLYING ARRANGEMENT FOR AN APPARATUS HAVING A ROTATING APPARATUS SHAFT

BACKGROUND OF THE INVENTION

The invention relates to a lubricating oil supplying arrangement for an apparatus having a rotating apparatus shaft and an oil pump, which is arranged at one end of the apparatus shaft and the displacement elements of which are driven by the apparatus shaft.

Such an arrangement is known from EP 0 811 767 A1. In a radial bearing housing for a compressor shaft, on the end face remote from the shaft there is provided a circular recess for receiving the internally toothed annular gear of a gerotor gear assembly. The apparatus shaft arranged eccentrically with respect thereto drives with its end portion the associated externally toothed gearwheel of the gerotor gear assembly. The whole assembly is closed off on the free side by a cover. Achieving the correct fit between moving and non-moving parts presents difficulties here. In addition, assembly is complicated.

SUMMARY OF THE INVENTION

The invention is based on the problem of simplifying the construction of an oil pump for an apparatus of the kind described in the introduction.

That problem is solved in accordance with the invention in that the pump housing comprises a pocket in the form of a chamber open on one side, in which the displacement elements are so arranged that the pump housing covers the displacement elements axially on both sides at least in an operative region and in the circumferential direction over a maximum of 180°, the displacement elements are held in position by a pump shaft, which passes through one displacement element and is connected thereto so that they rotate together, and the pump shaft is connected by way of coupling elements to the apparatus shaft so that they rotate together.

In this construction, the oil pump is pre-fabricated such that the displacement elements are inserted radially into the pocket of the pump housing and are held in position there by insertion of the pump shaft. In this case, very narrow tolerances can be achieved. Assembly too is simple. Afterwards, all that is required is to connect the pump housing to a stationary part of the apparatus and to couple the apparatus shaft to the pump shaft.

It will be noted that the non-prior-published DE 197 17 295.4 describes a fluid machine, in which the housing has a pocket in the form of a chamber open on one side, in which the displacement elements are so arranged that the housing covers the displacement elements axially on both sides at least in an operative region and in the circumferential direction over a maximum of 180°. Furthermore, the displacement elements are held in position by a shaft that passes through one displacement element and is connected thereto so that they rotate together. Express reference will be made to numerous further details that can be derived from the prior application and which are also useful for development in the present case.

In a preferred construction, provision is made for the pump housing to cover an end-face recess of the apparatus shaft and for the coupling elements to be arranged in this recess. Housing the coupling elements in the recess of the apparatus shaft enables the apparatus shaft to be given a considerably larger diameter than the pump shaft, as is desirable for mechanical reasons.

It is advisable for the coupling elements to comprise a transverse bolt passing radially through the recess, the bolt having an annular channel at its middle, and, on the pump shaft, a fork engaging in the annular channel. This permits simple assembly.

It is especially advantageous if the pump housing is inserted in a radial bearing housing receiving one end of the apparatus shaft and is secured there against rotation and forms an axial bearing for the apparatus shaft. During assembly, it is sufficient for the end of the apparatus shaft to be simply inserted in the radial bearing housing and be rotated until the coup ling elements engage one another. Moreover, the pump housing assumes an additional function.

In this connection, it is advantageous for the pump housing to be arranged at the lower end of a vertically positioned apparatus shaft. The a pparatus shaft then lies by virtue of its own weight against the axial bearing.

It is also advisable for the pocket to be located in the lower part of the pump housing. In t he case of this configuration, the open part of the pocket is located in the oil sump, so that no further additional measures have to be taken for oil intake. A rapid oil supply is therefore ensured as soon as the pump shaft starts a rotation. Delays because of intake are significantly reduced.

It is especially advantageous for at least one lubricating duct to lead out from the recess and for pressure ducts to be provided in the pump housing in the operative region, which open out into the end-face recess of the apparatus shaft. The pressure ducts can be formed by simple axially parallel bores. The recess serves as a collecting space for the lubricating oil under pressure.

A lubricating duct preferably runs in the apparatus shaft, as is already known for refrigerant compressors.

Alternatively or at the same time, a lubricating duct can also lead to the radial bearing of the apparatus shaft.

In the latter case, it is advisable for the transverse bolt to have two longitudinal bores, which each connect a respective transverse bore with an annular channel provided in the radial bearing housing and adjacent to the radial bearing. This produces a low-resistance lubricating duct.

In addition, it is advantageous for the displacement elements to be gerotor gear assemblies. This produces an especially good oil-conveying action.

It is also advantageous for the apparatus to be a spiral compressors. Such compressors are known, for example, from DE 33 00 838 A1. With the motor running they convey a relatively large amount of refrigerant constantly.

The oil pump can also be used to advantage when the apparatus is a different compressor, especially a piston compressor, a motor, especially a combustion motor, or a pump.

BRIEF DESCRIPTION OF THE DRAWINGS

The invention is described in detail in the following with reference to a preferred exemplary embodiment and in conjunction with the drawings, in which.

DESCRIPTION OF THE PREFFERED EMBODIMENTS

Figure 1:
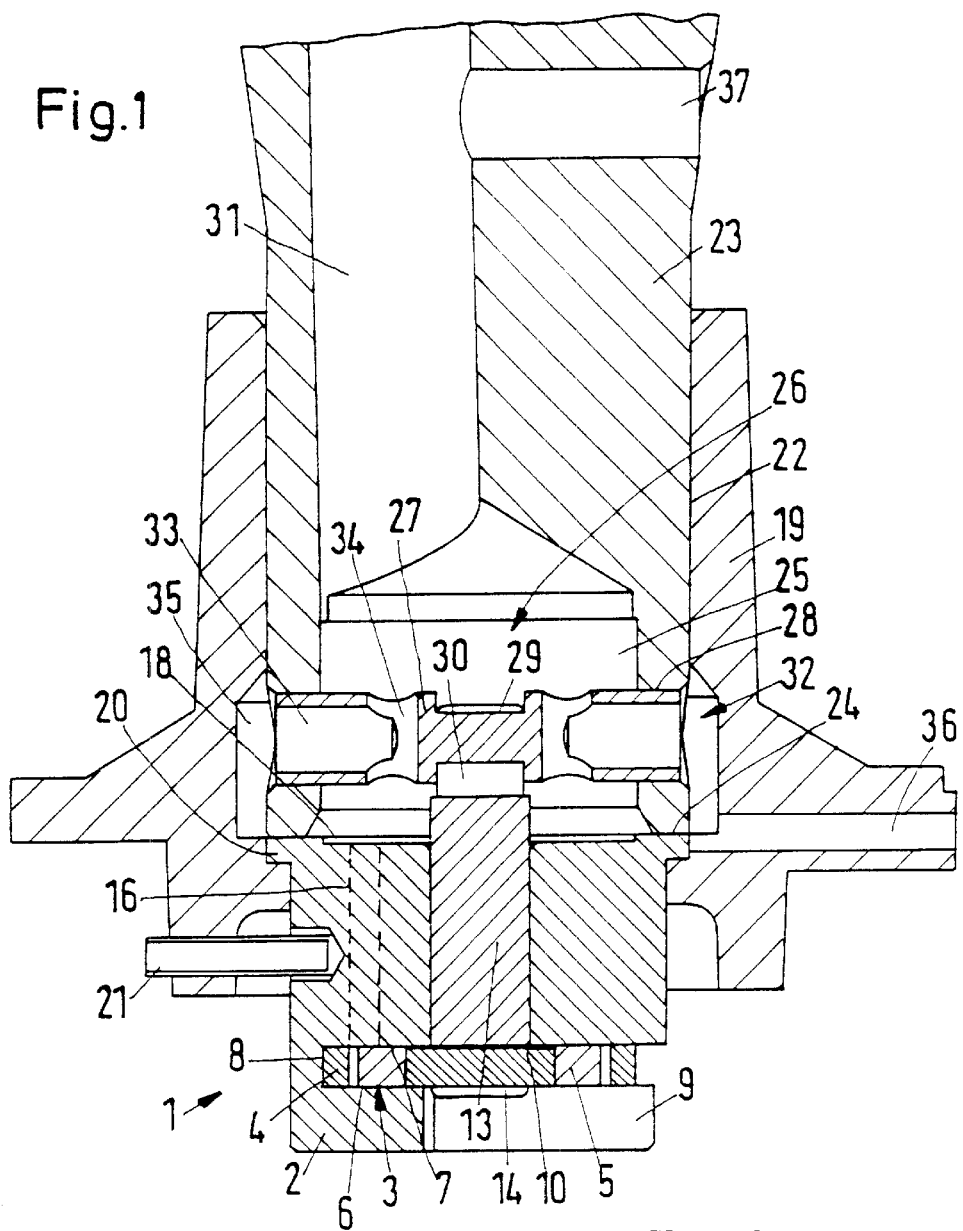
FIG. 1 is a longitudinal section through an oil pump according to the invention.
Figure 2:
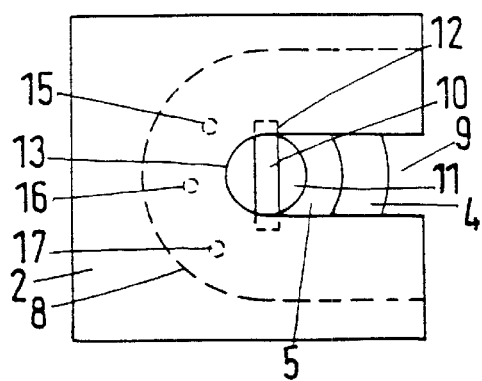
FIG. 2 is a diagrammatic view from below onto a construction similar to that of FIG. 1.
Figure 3:
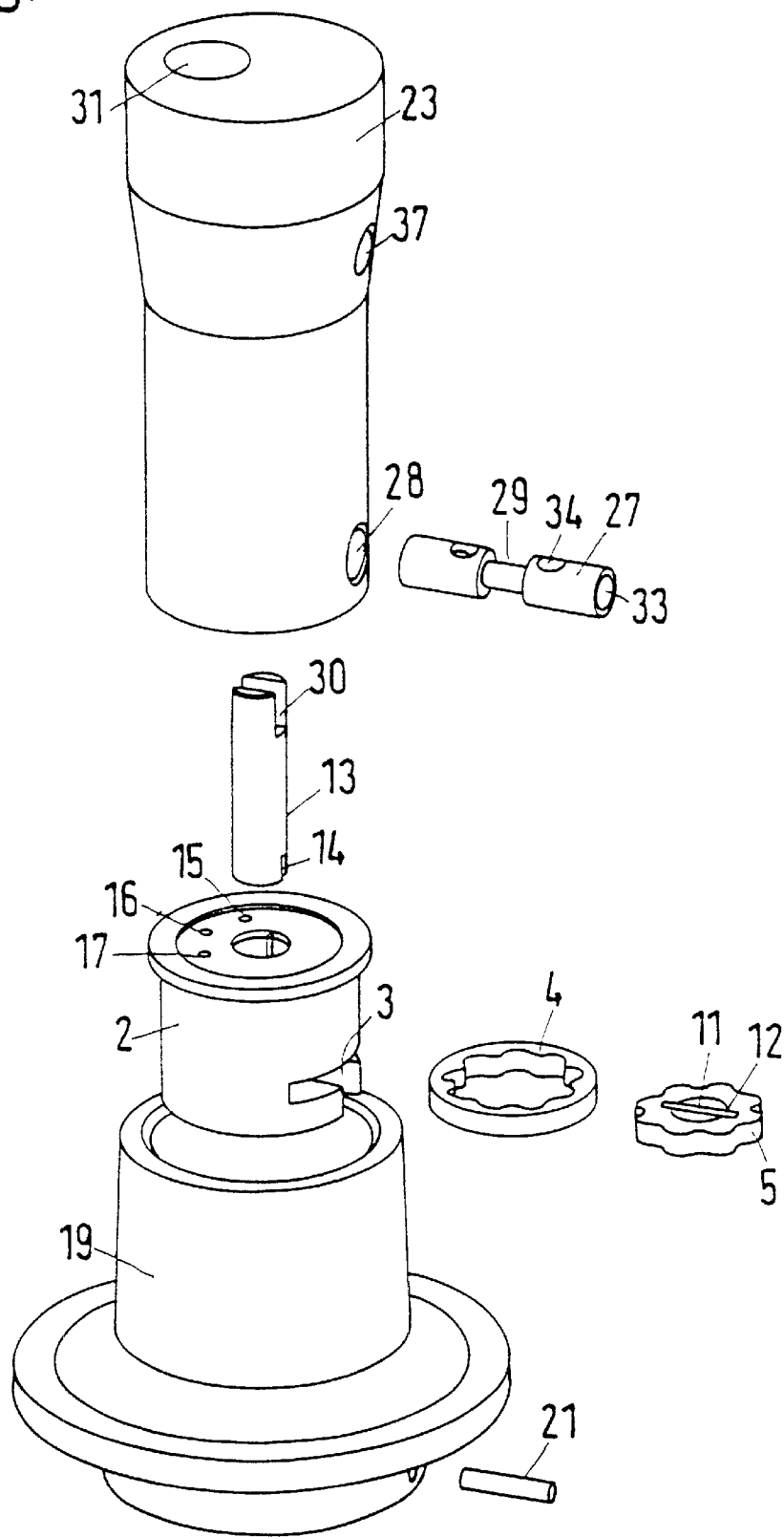
FIG. 3 is an exploded view of the parts of FIG. 1.

An oil pump 1 comprises a pump housing 2, which has a pocket 3 in the form of a chamber open on one side. Disposed in the pocket are a displacement element 4 in the form of an internally toothed annular gear, and a second displacement element 5 in the form of an externally toothed gearwheel, the midpoints of which elements are offset from one another. The numbers of teeth of the two displacement elements can be different. The lateral walls 6 and 7 of the pocket 3 run parallel to one another and can be matched with great precision to the thickness of the displacement elements 4 and 5. The circumferential wall 8 of the pocket runs on a circular arc of 180°, which corresponds to the circumference of the first displacement element 4. Furthermore, on its underside the pocket 3 has a slot 9, which allows a simpler manufacture, for example, by means of a disc milling cutter.

A transverse bolt 10 passes through a central hole 11 of the second displacement element 5 and is held by its ends in cutouts 12 in this displacement element. A pump shaft 13, which is mounted in a bore of the pump housing 2, carries at its lower end a slot 14, which engages over the transverse bolt 10 to produce a connection without relative rotation between pump shaft and second displacement element 5.

The slot 9 lying on the underside of the pocket serves as intake duct. Axially parallel bores form pressure ducts 15, 16 and 17, which open out at the top side 18 of the pump housing 2. The pressure duct region is also referred to as the operative region, that is to say, in which fluid under pressure can be removed.

The pump housing 2 is set in a radial bearing housing 19 and is supported with an edge 20 on a complementary step of this radial bearing housing 19. In this position, it can be secured against rotation by means of a holding device 21, for example, a clamping screw or a presser pin. The radial bearing housing 19 forms a radial bearing 22 for the lower end of an apparatus shaft 23. This bears by virtue of the weight of the apparatus with its lower end face 24 on the upper side 18 of the pump housing 2, so that an axial bearing is produced for the apparatus shaft.

On its underside, the apparatus shaft 23 has a recess 25 which is in connection with the pressure ducts 15, 16, 17. Furthermore, the recess 25 receives coupling elements 26, that is to say, a transverse bolt 27, which is secured in a bore 28 of the apparatus shaft 23 and has an annular channel 29 in its middle section. At its upper end, the pump shaft 13 has a fork created by a slot, which fork engages in the annular channel 29. The pump shaft 13 is accordingly connected to the apparatus shaft 23 so that they rotate together.

Furthermore, a first lubricating duct 31, which runs inside the apparatus shaft 23, and a second lubricating duct 32, which serves to lubricate the radial bearing 22, lead out of the recess 25. So that the second lubricating duct 32 has a low flow resistance, the transverse bolt 27 has two longitudinal bores 33, which each connect a respective transverse bore 34 connected to the recess 25 to an annular channel 35, which is located close to the radial bearing 22. A radial bore 36, which is normally closed, but in special cases can be used as a further lubricating duct, adjoins the annular channel 35.

The first lubricating duct 31 runs obliquely upwards, so that in operation a certain centrifugal action occurs. A transverse bore 37 can serve to allow refrigerant entrained with the oil to escape.

On assembly, first of all the oil pump 1 is completed. This is effected by introducing the displacement elements 4 and 5 radially into the pocket 3. The pump shaft 13 is then introduced and coupled to the second displacement element 5. The pump housing 2 is then introduced into the radial bearing housing 19 and secured against rotation by the holding device 21. Finally, the transverse pin 27 is pushed into the apparatus shaft 23 and the latter is introduced from above into the radial bearing housing 19. By slight rotation, coupling of the transverse bolt 28 with the fork 30 of the pump shaft 13 is effected. All these steps can be automated very easily and be performed by an automatic manipulator.

The exemplary embodiments described can be modified in many respects, without departing from the basic concept of the invention. In particular, the displacement elements can be of different forms, as described in DE 197 17 295. The gerotor construction is preferred however, on account of the minimal radial space it requires.

The compressor can also be operated with the apparatus shaft 23 horizontal. In that case, the opening of the pocket 3, including the slot 9, must be closed off by an enclosing part and be connected to the oil sump via a downwardly extending suction pipe.

What is claimed is:

1. A lubricating oil supplying arrangement for an apparatus having a rotating apparatus shaft and an oil pump which is arranged at one end of the apparatus shaft and the pump having displacement elements which are driven by the apparatus shaft, and a pump housing having a pocket in the form of a chamber open on one side, in which the displacement elements are so arranged that the pump housing covers the displacement elements axially on both sides at least in an operative region and in a circumferential direction over a maximum of 180°, the displacement elements being held in position by a pump shaft which passes through one of the displacement elements and is connected thereto so that the pump shaft and the one displacement element rotate together, and the pump shaft being connected by way of coupling elements to the apparatus shaft so that the pump shaft and the apparatus shaft rotate together.

2. An arrangement according to claim 1, in which the pump housing covers an end-face recess of the apparatus shaft and the coupling elements are located in the recess.

3. An arrangement according to claim 2, in which the coupling elements comprise a transverse bolt passing radially through the recess, the bolt having an annular channel at its middle, and a fork on the pump shaft engaging in the annular channel.

4. An arrangement according to claim 1, in which the pump housing is inserted in a radial bearing housing receiving one end of the apparatus shaft and is secured against rotation and forms an axial bearing for the apparatus shaft.

5. An arrangement according to claims 1, in which the pump housing is located at a lower end of the apparatus shaft when positioned vertically.

6. An arrangement according to claim 5, in which the pocket is located in the lower part of the pump housing.

7. An arrangement according to claim 1, in which at least one lubricating duct leads out from the recess, and including pressure ducts located in the pump housing which open out into an end-face recess of the apparatus shaft.

8. An arrangement according to claim 7, in which a lubricating duct runs in the apparatus shaft.

9. An arrangement according to claim 7, in which a lubricating duct leads to a radial bearing for the apparatus shaft.

10. An arrangement according to claim 9, in which the transverse bolt has two longitudinal bores each of which connects a respective transverse bore with an annular channel provided in the radial bearing housing and adjacent to the radial bearing.

11. An arrangement according to claim 3, in which the transverse bolt has two longitudinal bores each of which connects a respective transverse bore with an annular channel provided in the radial bearing housing and adjacent to the radial bearing.

12. An arrangement according to claim 1, in which the displacement elements comprise gerotor gear assemblies.

* * * * *